United States Patent
Alt et al.

(10) Patent No.: US 10,393,603 B2
(45) Date of Patent: Aug. 27, 2019

(54) VISUO-HAPTIC SENSOR

(71) Applicant: Technische Universität München, Munich (DE)

(72) Inventors: Nicolas Alt, Munich (DE); Eckehard Steinbach, Olching (DE); Martin Freundl, Mähring (DE)

(73) Assignee: Technische Universität München, Munich (DE)

( * ) Notice: Subject to any disclaimer, the term of this patent is extended or adjusted under 35 U.S.C. 154(b) by 215 days.

(21) Appl. No.: 15/592,326

(22) Filed: May 11, 2017

(65) Prior Publication Data

US 2017/0328795 A1 Nov. 16, 2017

(30) Foreign Application Priority Data

May 13, 2016 (DE) .................. 10 2016 108 966

(51) Int. Cl.
| | |
|---|---|
| *G01L 5/22* | (2006.01) |
| *G06T 7/73* | (2017.01) |
| *G06T 7/246* | (2017.01) |
| *G01L 1/24* | (2006.01) |
| *G01L 3/08* | (2006.01) |

(52) U.S. Cl.
CPC ............. *G01L 5/226* (2013.01); *G01L 1/24* (2013.01); *G01L 3/08* (2013.01); *G06T 7/248* (2017.01); *G06T 7/74* (2017.01); *G06T 2207/10016* (2013.01); *G06T 2207/30164* (2013.01)

(58) Field of Classification Search
CPC ... G01L 1/24; G01L 3/08; G01L 5/226; G06T 2207/10016; G06T 2207/30164; G06T 7/248; G06T 7/74
See application file for complete search history.

(56) References Cited

U.S. PATENT DOCUMENTS

| | | | |
|---|---|---|---|
| 6,606,540 B1 | 8/2003 | Gross | |
| 7,444,887 B2 * | 11/2008 | Yoshida | .................... G01L 1/24 73/862.041 |
| 7,707,001 B2 * | 4/2010 | Obinata | ................. B25J 13/082 356/32 |
| 7,878,075 B2 | 2/2011 | Johansson et al. | |
| 8,191,947 B2 | 6/2012 | Kervanoael | |
| 8,411,140 B2 * | 4/2013 | Adelson | ............... A61B 5/1172 348/135 |

(Continued)

FOREIGN PATENT DOCUMENTS

| | | |
|---|---|---|
| DE | 19750671 C2 | 6/2002 |
| DE | 102010023727 A1 | 12/2011 |

(Continued)

OTHER PUBLICATIONS

Kamiyama et al.; A Vision-based Tactile Sensor; Dec. 2001; ICAT 2001; pp. 1-8.*

(Continued)

*Primary Examiner* — Peter D Le
(74) *Attorney, Agent, or Firm* — Smartpat PLC

(57) ABSTRACT

The present disclosure presents a visuo-haptic sensor, which is based on a passive, deformable element whose deformation is observed by a camera. In particular, the improved simplified sensor may determine the force and/or torque applied to a point of the sensor in multiple spatial dimensions.

11 Claims, 10 Drawing Sheets

(56) References Cited

U.S. PATENT DOCUMENTS

| | | | |
|---|---|---|---|
| 8,421,311 | B2 | 4/2013 | Chuang et al. |
| 8,671,780 | B2 | 3/2014 | Kwom et al. |
| 10,131,053 | B1* | 11/2018 | Sampedro .............. B25J 9/1666 |
| 2008/0027582 | A1* | 1/2008 | Obinata ................. B25J 13/082 |
| | | | 700/260 |
| 2008/0202202 | A1* | 8/2008 | Ueda ..................... B25J 13/084 |
| | | | 73/9 |
| 2008/0245955 | A1* | 10/2008 | Tachi ....................... G01L 1/247 |
| | | | 250/221 |
| 2008/0303784 | A1* | 12/2008 | Yamaguchi ............. G06F 3/016 |
| | | | 345/156 |
| 2009/0253109 | A1* | 10/2009 | Anvari ................... G09B 23/28 |
| | | | 434/262 |
| 2010/0300230 | A1* | 12/2010 | Helmer ................... B25J 9/106 |
| | | | 74/469 |
| 2011/0298709 | A1* | 12/2011 | Vaganov ............. G06F 3/03545 |
| | | | 345/158 |
| 2012/0198945 | A1* | 8/2012 | Yoneyama ............. B25J 13/083 |
| | | | 73/862.042 |
| 2013/0070074 | A1* | 3/2013 | Won ........................ G01L 1/247 |
| | | | 348/77 |
| 2014/0336669 | A1* | 11/2014 | Park ....................... A61B 34/30 |
| | | | 606/130 |
| 2015/0366624 | A1* | 12/2015 | Kostrzewski ...... A61B 17/3421 |
| | | | 606/130 |
| 2016/0107316 | A1 | 4/2016 | Alt et al. |

FOREIGN PATENT DOCUMENTS

| | | |
|---|---|---|
| DE | 102013017007 A1 | 4/2015 |
| WO | 2005029028 A1 | 3/2005 |

OTHER PUBLICATIONS

A. Kimoto and Y. Matsue. A new multifunctional tactile sensor for detection of material hardness. IEEE Transactions on Instrumentation and Measurement, 60(4):1334-1339, 2011.

D. G. Lowe. Distinctive image features from scale-invariant keypoints. International Journal of Computer Vision, 60(2):91-110, 2004.

D. Göger, N. Gorges, and H. Wörn. Tactile sensing for an anthropomorphic robotic hand: Hardware and signal processing. In IEEE International Conference on Robotics and Automation (ICRA), Kobe, Japan, May 2009.

Dömötör Ákos, OptoForce White Paper, Jan. 2015.

E Knoop and J. Rossiter, "Dual-mode compliant optical tactile sensor," in IEEE International Conference on Robotics and Automation (ICRA), Karlsruhe, Germany, May 2013.

E. Malis. Improving vision-based control using efficient second-order minimization techniques. In IEEE International Conference on Robotics and Automation (ICRA), New Orleans, LA, USA, Apr. 2004.

F. Mazzini, D. Kettler, J. Guerrero, and S. Dubowsky. Tactile robotic mapping of unknown surfaces, with application to oil wells. IEEE Transactions on Instrumentation and Measurement, 60(2):420-429, 2011.

Faragasso, A., Bimbo, J., Noh, Y., Jiang, A., Sareh, S., Liu, H., . . . & Althoefer, K. Novel uniaxial force sensor based on visual information for minimally invasive surgery. In IEEE International Conference on Robotics and Automation (ICRA), Hong Kong, China, May 2014.

H. Kato and M. Billinghurst. Marker tracking and hmd calibration for a video-based augmented reality conferencing system. In IEEE and ACM International Workshop on Augmented Reality, San Francisco, CA, USA, 1999.

H. Yousef, M. Boukallel, and K. Althoefer. Tactile sensing for dexterous in-hand manipulation in robotics—a review. Sensors and Actuators A: Physical, 167(2):171-187, Jun. 2011.

J. Bohg, M. Johnson-Roberson, M. Björkman, and D. Kragic. Strategies for multi-modal scene exploration. In IEEE/RSJ International Conference on Intelligent Robots and Systems (IROS), Taipei, Taiwan, Oct. 2010.

J.-I. Yuji and K Shida. A new multifunctional tactile sensing technique by selective data processing. IEEE Transactions on Instrumentation and Measurement, 49(5):1091-1094, 2000.

K. Kamiyama, K. Vlack, T. Mizota, H. Kajimoto, N. Kawakami, and S. Tachi, "Vision-based sensor for real-time measuring of surface traction fields," IEEE Computer Graphics and Applications, vol. 25, No. 1, pp. 68-75, 2005.

K. Khoshelham and S. O. Elberink. Accuracy and resolution of kinect depth data for indoor mapping applications. Sensors, 12(2):1437-1454, 2012.

L. J. Gibson and M. F. Ashby, "Chapter 5—The mechanics of foams: basic results" In "Cellular Solids: Structure and Properties", Cambridge solid state science series. Cambridge University Press, Cambridge, 2nd edition, 1999.

M. Kaneko, N. Nanayama, and T. Tsuji, "Vision-based active sensor using a flexible beam," IEEE/ASME Transactions on Mechatronics, 6(1):7-16, Mar. 2001.

M. Kass, A. Witkin, and D. Terzopoulos, "Snakes: Active contour models," International Journal of Computer Vision, vol. 1, No. 4, pp. 321-331, Jan. 1988.

N. Alt, E. Steinbach, A Visuo-haptic Sensor for the Exploration of Deformable Objects,Int. Workshop on Autonomous Grasping and Manipulation: An Open Challenge,in conjunction with IEEE Int. Conf. on Robotics and Automation, Hong Kong, May 2014.

N. Alt, E. Steinbach, Navigation and Manipulation Planning using a Visuo-hapticSensor on a Mobile Platform, IEEE Trans. on Instrumentation and Measurement,vol. 63, No. 11, 2014.

N. Alt, E. Steinbach, Visuo-haptic sensor for force measurement and contactshape estimation, Proc. of IEEE Int. Symposium on Haptic Audio-VisualEnvironments and Games (HAVE), Istanbul, Turkey, Oct. 26-27, 2013.

N. Alt, J. Xu, and E. Steinbach, Grasp planning for thin-walled deformable objects. In Robotic Hands, Grasping, and Manipulation (ICRA Workshop), Seattle, WA, USA, May 2015.

N. Alt, Q. Rao, E. Steinbach, Haptic Exploration for Navigation Tasks using a Visuo-Haptic Sensor, Interactive Perception Workshop, ICRA 2013, Karlsruhe, Germany, May 2013.

P. Mittendorfer, E. Dean, and G. Cheng. 3d spatial self-organization of a modular artificial skin. In IEEE/RSJ International Conference on Intelligent Robots and Systems (IROS), Chicago, USA, Sep. 2014.

R. Bischoff, J. Kurth, G. Schreiber, R. Koeppe, A. Albu-Schaeffer, A. Beyer, O. Eiberger, S. Haddadin, A. Stemmer, G. Grunwald, and G. Hirzinger. The KUKA-DLR lightweight robot arm—a new reference platform for robotics research and manufacturing. In Robotics (ISR), International Symposium on and German Conference on Robotics (ROBOTIK), Munich, Germany, Jun. 2010. VDE.

S. Baker and I. Matthews. Lucas-kanade 20 years on: A unifying framework. International Journal of Computer Vision, 56(3):221-255, Feb. 2004.

S. Benhimane, A. Ladikos, V. Lepetit, and N. Navab. Linear and quadratic subsets for template-based tracking. In IEEE Conference on Computer Vision and Pattern Recognition (CVPR), Minneapolis, MN, USA, Jun. 2007.

S. Chitta, J. Sturm, M. Piccoli, and W. Burgard. Tactile sensing for mobile manipulation. IEEE Transactions on Robotics, 27(3):558-568, 2011.

S. Tsuji, A. Kimoto, and E. Takahashi. A multifunction tactile and proximity sensing method by optical and electrical simultaneous measurement. IEEE Transactions on Instrumentation and Measurement, 61(12):3312-3317, 2012.

T. F. Cootes, C. J. Taylor, D. H. Cooper, J. Graham, and others. Active shape models—their training and application. Computer Vision and Image Understanding, 61(1):38-59, 1995.

* cited by examiner

VISUO-HAPTIC SENSOR

CROSS-REFERENCE TO RELATED APPLICATION

This application claims the benefit of German patent application No. 10 2016 108 966.4 filed 13 May 2016 which is incorporated herein by reference.

TECHNICAL FIELD

The present disclosure presents a visuo-haptic sensor, which is based on a passive, deformable element whose deformation is observed by a camera. In particular, an improved simplified sensor may determine the force and/or torque applied to a point of the sensor in multiple spatial dimensions.

BACKGROUND

Autonomous robots rely on a variety of different sensor systems to obtain a rich, multi-modal representation of the environment. Haptic perception mainly depends on force sensors, which are available in many variants.

Force sensors either measure a force, a torque, or both force and torque (force and/or torque) vector at a single point, or a contact force distributed over a surface.

Force sensors that measure contact force profiles are often categorized as tactile sensors. In general, forces are kinesthetic data and not tactile data. Thus, the distinction between a force sensor and a tactile sensor is often not clear, which is why we use the generic term "haptic sensor".

Force and/or torque sensors are usually installed between a robot arm and a tool (the end-effector) in order to measure the contact forces between a tool and the environment at a single point during grasping, manipulation tasks like mounting or placing of objects as well as gravitational and acceleration forces while moving objects.

Modern robots are also equipped with visual sensors, such as cameras. Cameras in the visual spectrum are the basic sensor for most computer vision algorithms such as object detection, visual search or pose estimation. An exemplary visuo-haptic sensor is disclosed in U.S. patent application publication 2016/0107316, published 21 Apr. 2016, the complete disclosure of which is herein incorporated by reference.

SUMMARY

According to a first aspect of the present disclosure, an apparatus 1 is provided comprising a haptic element comprising at least one passive elastically deformable element 3 which is deformable in multiple dimensions. At least one camera 4 external to the haptic element and operable to capture images of the elastically deformable element 3 is provided. Further, a processor 5 is also provided, wherein the processor 5 is operable to determine a change of pose of the elastically deformable element 3 and determine a measurement of force and torque 10 applied to the elastically deformable element 3 based on the captured images and the determined change of pose, wherein the measurement includes at least three components comprising forces and/or torques. This enables measurement of a force and/or torque 10 reading at a single point in multiple spatial dimensions i.e. more than two dimensions using passive elements, and obviates the need for complex integrated circuitry to be built into the haptic element.

According to one embodiment thereof, the measurement comprises a 6-axis force and/or torque vector comprising forces along all three spatial dimensions and torques along all three spatial dimensions. The present disclosure advantageously makes it possible to determine a full 6D force and/or torque measurement using the passive elements, thereby providing a high level of accuracy due to achieving a measurement including the maximum number of dimensions for both force and torque.

According to a further embodiment, the haptic element further comprises a rigid base element 6 and a rigid front element 7 coupled via the elastically deformable element 3. Additionally, according to this embodiment, the processor 5 is further operable to determine the change of pose of the rigid front element with respect to the base element.

According to one embodiment thereof, the deformable element consists of two parts, a spring 31 and a beam 32 mounted between the base element 6 and the front element 7 and connected at point 38. In order to determine the multiple spatial measurement of force, forces and torques applied at tool 9 along or around axes Y, Z, lead to a deflection of the beam as shown in FIG. 2b.

According to a different embodiment thereof, the rigid base element 6 and rigid front element 7 comprise planar structures 80, 81. By providing planar structures, a larger surface area (than a beam) may be created which facilitates determination of minimal changes in pose of the elements being captured. In this way, the force detection sensitivity of the apparatus 1 is increased. In a preferred exemplary implementation described below, a disk 61 implements both the base element and one planar structure, and a disk 71 implements both the front element and the second planar structure. The skilled person will appreciate that many other shapes of planar structure such as H or T shapes would be suitable. In some cases, the rigid front element 7 may have a smaller surface area with respect to the rigid base element 6. This provides a convenient means for expressing the pose of the rigid front element 7 within the coordinate frame of rigid base element 6.

In an embodiment of the first aspect, the change of pose is determined by observing at least two points on the haptic element. This is possible when using a depth and a depth gradient from a depth camera as the camera 4 observing the haptic element. According to this embodiment, a simpler technique than tracking templates or patterns is provided for determining force. An advantage of this embodiment is that less data processing is required, thereby making minimal impact on valuable processing resources needed for other parts of a system in which the apparatus 1 may be integrated.

In a further embodiment, the change of pose is determined by observing three or more points on the haptic element. This is possible when using a normal camera 4 to observe the haptic element. The increased number of observation points leads to increased accuracy of the force and/or torque measurement.

In yet another embodiment, the change of pose is determined by a visual tracker. Visual tracking allows for highly accurate pose estimation in comparison to many other known methods which provide results with such a level of inaccuracy to not be feasible.

In another preferred embodiment, the haptic element is mechanically attached to a movable robotic element and the movable robotic element is included in the field of view of the camera 4. This advantageously provides a more efficient use of resources as the camera 4 can also be used for other applications e.g. tracking movement of a robotic arm to which the sensor is attached.

In a further preferred embodiment, the haptic element is mounted within the structure of a robotic arm, manipulator or a kinematic chain. By virtue of using passive elements, the present disclosure facilitates integration with the structure since it does not create an additional discrete electronic system which could otherwise undesirably interfere with the distinct electronic systems of the e.g. robotic arm.

In a second aspect of the present disclosure, a method is provided, the method comprising the steps of providing a haptic element comprising at least one passive elastically deformable element 3; capturing images of the haptic element with at least one camera 4; determining a change of pose of the passive elastically deformable element 3; and determining a measurement of force and torque 10 applied to the passive elastically deformable element 3 based on the captured images and the determined change of pose, wherein the measurement includes at least three components comprising forces and/or torques.

According to a preferred embodiment of the second aspect, the measurement comprises a 6-axis force and/or torque vector comprising forces along all three spatial dimensions and torques along all three spatial dimensions.

According to further embodiments of the second aspect, the method further comprises a step of determining a change in pose of elastically deformable element by at least one of: observing at least two points on the haptic element, by observing three or more points on the haptic element and/or visually tracking the haptic element.

According to a preferred exemplary implementation, a visuo-haptic sensor is presented, which uses standard cameras 41,42 to obtain haptic data, i.e. force and torque 10 during manipulation operations. The camera 4 measures a haptic element, consisting of deformable element 3, which is mounted between a robot actuator (such as a robotic arm) and a tool, such as a gripper, a screwdriver or a sensor tip. The deformation of this element is converted to a multidimensional force and/or torque reading based on its known deformation model. Ideally, a 6D force and/or torque 10 applied to the tool 9 is determined from the deformation, which is calculated from the camera image. According to this example, deformable elements 3 may be made of plastic or rubber, as well as with a beam-like structure. However, the skilled person will appreciate that Euler-Bernoulli beam theory is equally applicable to complex cross-sections, such as those comprising an H or T shape. Visual observations from the object, the scene or the components of the robot may be acquired by the same camera 4 and are thus naturally coherent with haptic data. This is an important advantage over existing haptic sensors with optical readout, which rely on an optical sensor inside of a deformable structure. Dedicated sensor systems can be replaced by a low-cost camera 4, which may be required for other tasks already, reducing costs and system complexity. Integration of visual data is important to observe the reaction of an object during manipulation, and also to verify the state of the manipulator itself. The accuracy of the sensor is shown to be good by comparison with an industrial force sensor. According to preferred implementations, two main embodiments are realized. The first one uses templates to observe the deformation of a deformable element comprising a spring 31 and a metallic beam 32 whilst the second one observes two disks connected by one or several deformable elements 33. This design allows for low-cost force and/or torque sensors which are naturally coherent with the visual modality as stated above.

Advantages

Compared to existing tactile/haptic sensors, the present disclosure offers a number of benefits:

Coherent visual and haptic/tactile measurements: The proposed sensor extracts haptic information from the camera image. Visual and haptic measurements are therefore naturally coherent, i.e. they are sampled and made available at the same point in time.

Smooth transition between haptic and visual data: Since both modalities are derived from the same data (i.e. the image), intermediate representation can be obtained. With separate sensor systems, their data representations cannot be easily converted. A hard switch between them might be required.

Mitigation of shortcomings of a single modality: For the same reasons as discussed above, missing data from one modality can be replaced by the other one. For instance, if the pose of a transparent object cannot be exactly determined based on visual methods, a refinement is possible based on haptic information.

Natural compliance, i.e. deformable elements result in "softness" of end-effectors. Compliance is an important safety feature for robots working together with humans.

Reduced effort for calibration: Mutual calibration of different sensors is a tedious task. With the present disclosure, calibration of cameras is sufficient.

Reduced system complexity: Dedicated sensor modules have their own processing units, their own firmware and require interfacing to a central processing unit. This results in a significant overhead during production, maintenance and calibration, since sensor units must be mounted all around a robot. Our system just on central processing and just requires passive mechanic components around the robot.

Centralized Processing

Reduced effort for cabling/networking: The passive deformable elements 3 do not require any cabling. They can thus be easily placed on any part of the robot with.

Very low costs: A new sensitive element is completely passive and can be produced for less than 1 EUR. Hereby, it is assumed that a vision system (camera 4, vision processor 5) is already available to observe the passive element(s) 3.

Any disadvantages according to the present disclosure are limited to low-end systems without any powerful processing unit wherein the addition of cameras and additional computers would not be feasible.

The present disclosure is particularly suited for complex robots which rely on multiple visual sensors and powerful processing units and can therefore profit the most from the aforementioned advantages.

Compared to purely vision-based sensors, the present disclosure acknowledges the need for haptic sensors which are essential for all kinds of manipulation tasks, even if highly accurate vision sensors are present. This applies both to existing haptic sensor systems and to the present disclosure.

DETAILED DESCRIPTION

Combined Detector and Tracker

Figure 1A:
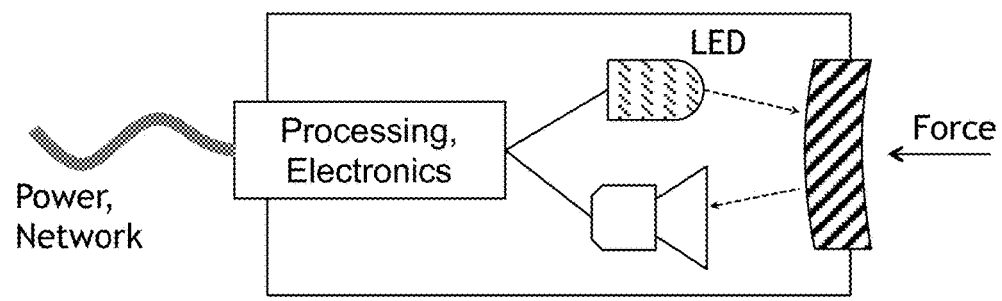
FIG. 1a illustrates a haptic/tactile sensor according to the prior art.
Figure 1B:
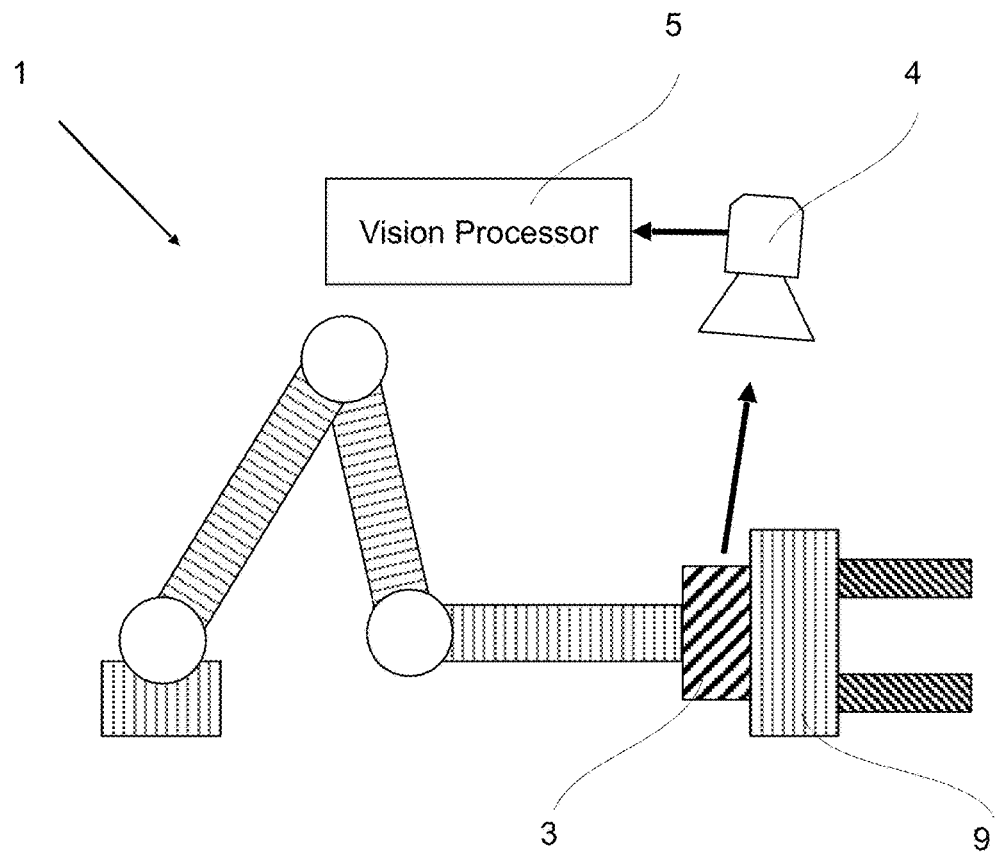
FIG. 1b illustrates an exemplary haptic sensor comprising a haptic element mounted between a robot arm and a gripper.

A combined tracker/detector for templates on planar structures 80,81,82 is used to find and follow a texture with an image or video provided by a camera 4. It is based on scale-invariant feature transform (SIFT) for feature detection and visual template tracking such as efficient second-order minimization (ESM) for tracking and refinement. Thus, the exact 6D pose of objects can be determined in realtime, as long as a model of the templates, i.e., an image with scale information, is available. The scale is determined from the dpi (dots-per-inch) value of the image file. The system detects/tracks multiple arbitrary planar templates such as printed designs or natural photos, simultaneously. Each template model is initialized on startup, i.e. SIFT features are extracted, and the tracker performs pre-calculations. Many artificial objects can be tracked directly using their printed texture as a model. Also, it is straight-forward to create real objects from template models at the exact scale with a standard printer. These templates are easily attached anywhere on a robot or an object. They offer more flexibility, ease of use and a higher tracking quality than 3D models or the pre-defined markers from the open source computer tracking library ARtoolkit.

The system relies on a GPU implementation of SIFT to search for the template models in the image. This step is too slow for processing at a framerate of 30 Hz on mid-range GPUs and should be avoided, if possible. Tracking is performed with ESM, which is either initialized from SIFT or from the pose of the previous frame. The latter case is preferred, since it allows skipping SIFT detection. Poses from ESM are much more accurate and less noisy than from SIFT matches. Tracking is always done with the "original" model, such that there is no drift, even if performed over long periods of time. Processing is split in multiple threads, running at different rates. Thread A performs SIFT detection and matching, if there is currently any template whose pose is unknown. Matching provides an estimate of the homography. The ESM runs in thread B at framerate and tracks all templates, for which initial poses are available. If required, each tracker may run in a separate thread to reduce latency on multi-core CPUs.

The real-world poses of the templates with respect to the camera 4 is obtained by homography decomposition, given the camera parameters.

Modeling Deformation of Beams

The deformation of beams or rods under load is described by the Euler-Bernoulli beam theory for small deflections. Here, a force and/or moment 10 perpendicular to the beam is applied at its front element 7, see FIG. 2b.

The other end of the beam 32 is considered to be fixed ("clamped"). In principle, the beam can be made of elastic material such as spring steel or plastic. Yet, no plastic (i.e. permanent) deformations should occur within the relevant range of deformations. We use a beam 32 made of spring steel with a diameter of about 2 mm and a length of 10-20 cm.

The deflection curve w(x) in 2D describes the deformation of the beam 32 along the y-axis over the x-axis:

$$\frac{d^2}{dx^2}\left(EI\frac{d^2w}{dx^2}\right) = \Big|_{EI=const} EI\frac{d^4w}{dx^4} = q(x) \quad (1)$$

This is the commonly-used approximation for small deflection, which ignores the shortening of the deformed beam 32 along the x-axis. The values for the elastic modulus E and the second moment of area I are constants for uniform and homogeneous beams. For a circular cross section of the beam 32 with radius r, $$I = \frac{\pi}{4}r^4.$$

There is no distributed load, such that q(x)=0. Quadruple integration of (1) yields four integration constants, which are used to fulfil the boundary conditions. Due to the clamping at x=0, w(0)=w'(0)=0. The derivatives of w have a distinct physical meaning—specifically the moment is M=−EIw″, and the shear force is Q=−EIw‴. Therefore, when a force F 10 is applied perpendicular to the beam at its end, boundary conditions are:

$$w'''\Big|_{x=L} = -\frac{F}{EI} \text{ and } w''\Big|_{x=L} = 0$$

The force 10 is applied at x=L, where L is the length of the beam 32. With four boundary conditions, a unique solution wF can be given for Eqn. (1). Similarly, for a moment or torque M applied at point x=L, a solution wM is determined using the boundary conditions:

$$w'''\Big|_{x=L} = 0 \text{ and } w''\Big|_{x=L} = -\frac{M}{EI}$$

Since the differential equation is linear, the two solutions can be superimposed. For a force and moment applied at ξ=1, with $$\xi = \frac{x}{L}$$

and clamping at x=0, we obtain:

$$w(\xi) = \quad (2)$$
$$w_F + w_M = \frac{FL^3(3\xi^2 - \xi^3)}{6EI} + \frac{ML^2\xi^2}{2EI} = -\frac{FL^3}{6EI}\xi^3 + \left(\frac{FL^3}{2EI} + \frac{ML^2}{2EI}\right)\xi^2$$

The deflection of the real beam is observed by a camera 4 at one or multiple points of the curve w. Extension of the discussed 2D case to 3D is straight-forward by separation along y and z, yielding deformation curves wy,wz, see FIG. 2b. Forces along or moments around the x-axis cause only very small deformations, which cannot be observed with a simple beam. A model according to Eqn. (2) is fitted to the observations and solved for F,M to obtain the causing force and torque. In the following, it is assumed that w and w' are known only at a single point $\xi_1 \in [0, 1]$. By rearranging Eqn. (2) and the derivate thereof, a linear expression w=W. f is obtained in matrix form, with $w=[w(\xi_1) w'(\xi_1)]^T$ and $f=[F\ M]^T$. Given an observation w, the acting force/moment f is obtained by inversion of W:

$$f = W^{-1} \cdot w, \quad (3)$$
$$W^{-1} = \frac{2EI}{L^2\xi^2}\begin{bmatrix} \frac{6}{L\xi} & -\frac{3}{L} \\ \frac{3(\xi-2)}{\xi} & -(\xi-3) \end{bmatrix} = \left|_{\xi=1} \frac{2EI}{L^2}\begin{bmatrix} \frac{6}{L} & -\frac{3}{L} \\ -3 & 2 \end{bmatrix}\right.$$

If multiple observations are available, we obtain an overdetermined system $[w|_{\xi_1}; w|_{\xi_2}; \ldots] = [W|_{\xi_1}; W|_{\xi_2}; \ldots] \cdot f$, which is solved for f by least-square minimization. From Eqn. (3), note that F is significantly more sensitive to changes in w than M for the typical case L<1. Also, there is a strong coupling of the two components.

Beam-Based 6D Force and/or Torque Sensor

Figure 2A:
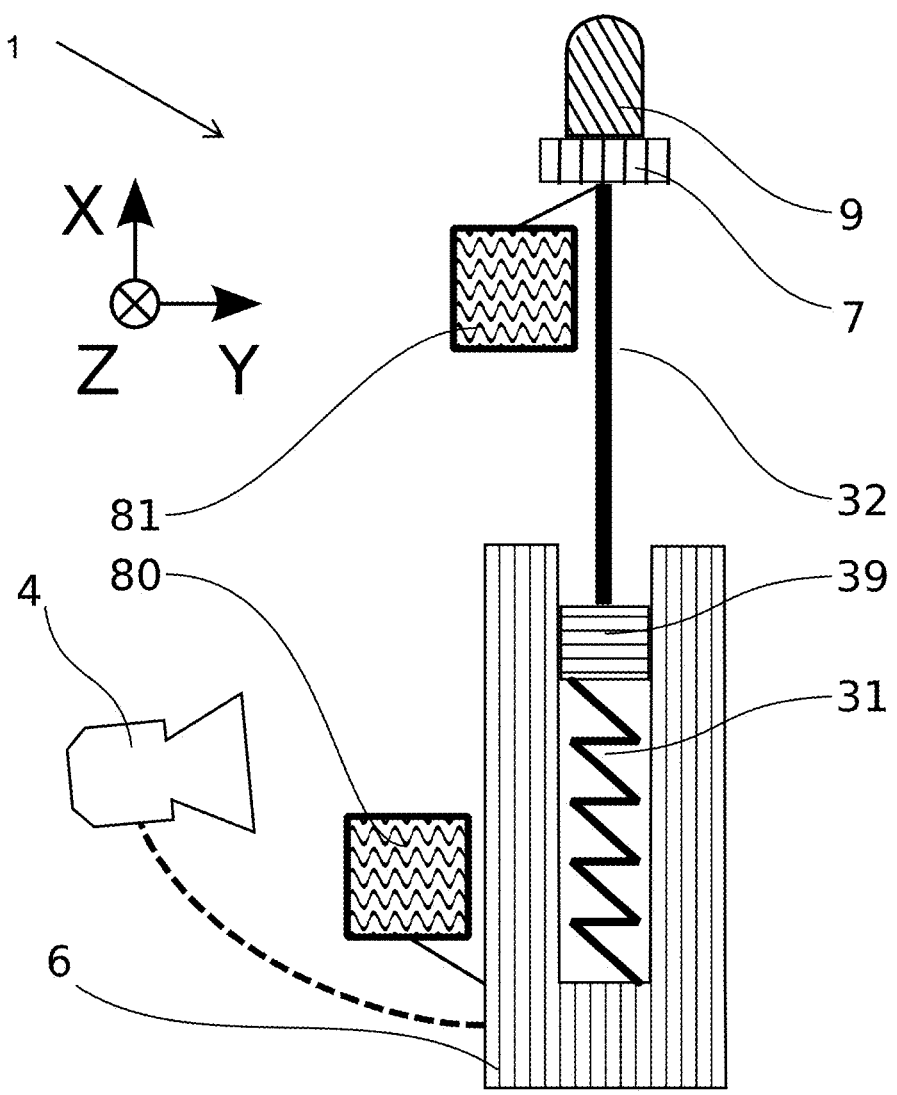
FIG. 2a illustrates an exemplary apparatus 1 with a guided spring 31 and a metal rod/beam 32 as deformable elements.
Figure 2B:
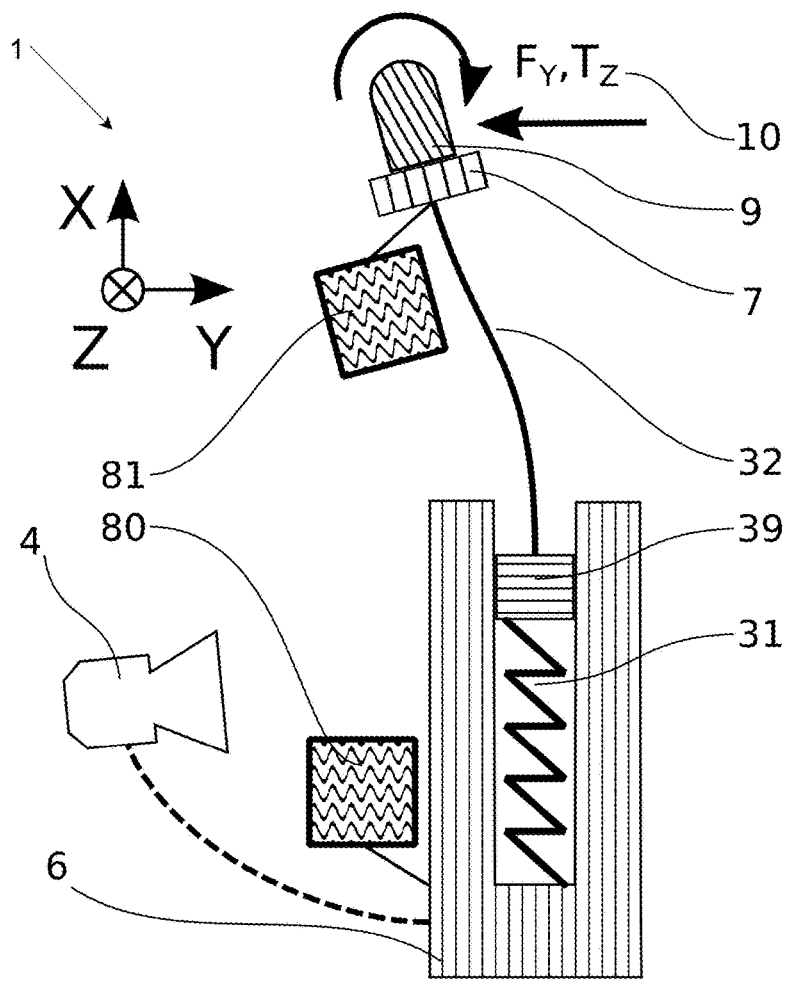
FIG. 2b illustrates a sensor according to FIG. 2a when an external force and/or torque 10 is applied to the tool 9.

FIG. 2a illustrates a design of a beam-based sensor. It is based on the guided spring 31 and the round beam 32 made of spring steel as the deformable element 3. The guiding limits the motion of the spring to compression along/torsion around the x-axis, and is implemented via guiding element 39, gliding in a pipe. Element 39 also connects spring 31 and beam 32. FIG. 2b shows the deflection of the beam/rod resulting from applied forces and/or torque 10. Force/moments along the x-axis deform the spring 31. A camera 4 observes the entire structure and tracks templates $\mathcal{T}_{R,A,B}$ on the planar structures 80,81. Many applications only require a force reading at a single point, but in multiple spatial dimensions—ideally as a full 6D force and/or torque reading. Typically, such sensors are mounted between the end-effector of a robot arm or another actuator and a tool 9—such as a gripper, screwdriver or specialized manipulator. Upon contact, forces and torques 10 imposed by the tool 9 onto an object (or vice versa) must be measured in up to six dimensions. Also, a human could guide the arm by imposing forces onto the tool. Therefore, the present disclosure proposes another design of a visuo-haptic sensor based on a haptic element consisting of metal beam 32 and spring 31 which together deform in 6D when a force and/or torque 10 is applied. Again, the passive component is measured by an external camera 4, which also observes the surrounding scene. It allows measuring forces and/or torque in multiple dimensions at a single point—much like commercial force and/or torque sensor modules. Note that the beam theory can be applied to elongated elements of various inner structure by adaptation of the shape constant I. Therefore, a deformable connection element within the arm—such as the link between the last two joints—could be used as the deformable element 3.

Figure 3:
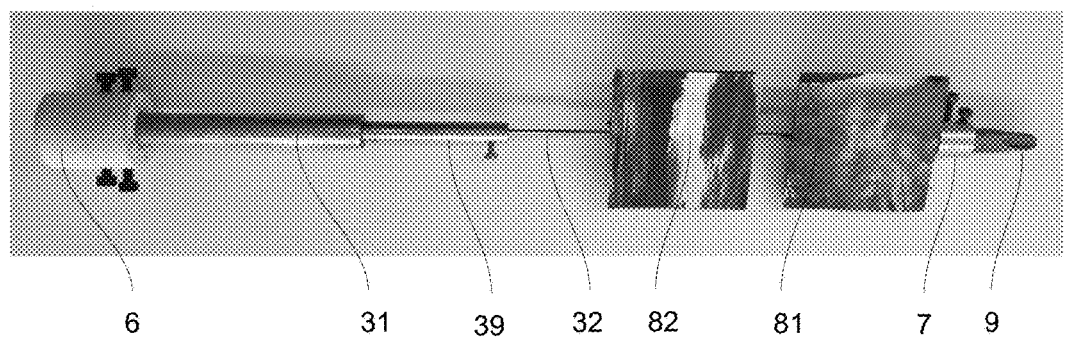
FIG. 3 illustrates a sensor according to FIG. 2a with a bit used as tool 9.

A photo based on this structure is shown in FIG. 3. The sensor according to FIG. 2a consists of a round rod of spring steel (the beam 32) between guiding element 39 and front element 7, as well as a guided spring 31 between base element 6 and 39. The base element 6 of the sensor is mounted to the actuator, which is typically a robot arm. The tool 9 is mounted on the other end 7. A camera 4 observes the entire sensor from 6 to 7, as well as the scene around it. Forces or moments/torques 10 applied at 7 along or around axes Y,Z lead to a deflection of the beam 32 as described in the above background section describing modeling deformation of beams. The deflections are separable into $w_Y$ and $w_Z$ and then processed as in the 2D case. Note, that $w_Y$ represents forces along Y and moments around Z. Due to the guidance via element 39 the spring 31 is not affected by these forces/moments. Forces or moments along or around X hardly deform the beam 32, since it is very stiff along this direction. Instead, a force along X results in a compression of the spring 31 between 6 and 39 according to Hooke's law. Similarly, a moment around X results in a torsion of the spring 31. The corresponding deformation models are straight-forward, and the stiffness constants are adjusted independently of the beam 32. Using this design, a full 6D force/moment can be read from the beam/spring deformation.

Observations of the deflection curve of the beam w may be obtained in different ways: An edge tracker may be used to track the two contours along the beam and provide a dense sampling of w. This approach provides a high robustness to occlusion, due to the large number of tracked points. However, point tracking does not provide any reliable depth information, basically limiting force measurements to 1D. Simple features along the beam 32—such as colored spheres—would allow for easier detection, yet still with very limited depth resolution. A template tracker/detector, see the above background section describing a combined detector and tracker, on the other hand, provides a full 6D pose, including accurate depth values and the full rotation, which corresponds to the derivatives of $w'_{Y,Z}$. Planar textured templates are attached along the beam 32 at a single fixture point via planar structures 80,81 respectively for this tracker. They may be integrated into the design of the robot case. The pose of the beam 32 at the fixture point and the template are related by a constant rigid transformation determined by the mounting structure. Only a low number of templates can be attached along the rod, resulting in a limited number of observations of w and w'. The acting force/moment 10 is calculated from these observations using (3) as outlined there.

Figure 4A:
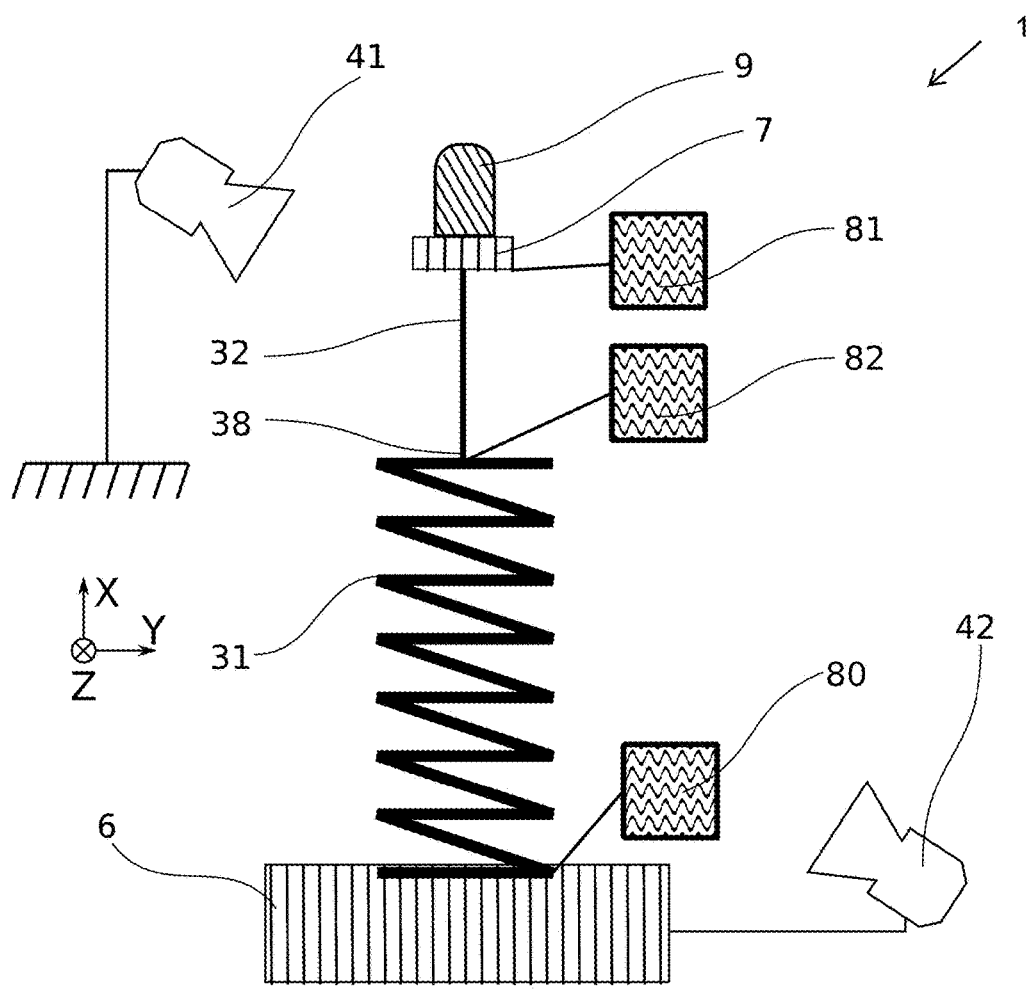
FIG. 4a illustrates a 6D force and/or torque sensor with an unguided spring 31 and a beam 32 as deformable elements.

As indicated in FIGS. 2a and 4a, multiple templates are attached to the sensor in our implementation via planar structures 80,81,82. The reference template $\mathcal{T}_R$ on structure

80 on the base element 6 provides a local reference frame $\mathcal{T}_R$ in which all sensor-related transformations are expressed.

Like that, the pose of the sensor may vary, and the camera 4 can move relative to the sensor. In principle, the reference frame may be fixed to the camera frame or calculated from a robot model. Yet, errors can be reduced significantly, if a reference frame is obtained within the image, close to where measurements are performed. Two templates $\mathcal{T}_{A,B}$ are attached along the beam 32, at fixed relative positions $\xi_{1,2}$. Since the templates on 81,82 are not aligned perfectly, and the beam 32 might exhibit some plastic deformation, a zeroing procedure is performed at startup, with zero force/moment 10 applied to the sensor. The corresponding resting poses $\mathcal{T}_{A0,B0}^{OO}$ are expressed relative to the frame $\mathcal{T}_R$.

Measurements of the template poses are performed for each video frame and expressed relative to their (constant) resting poses, which in turn are based on the current (variable) reference frame $\mathcal{T}_R$. Thus, the poses $\mathcal{T}_A^{(A0)}, \mathcal{T}_B^{(B0)}$ are zero as long as the beam 32 is not deformed—regardless of the current sensor orientation. Since the Y and Z components are processed separately, the respective translational components of $\mathcal{T}_x^{(*0)}$ correspond directly to samples of $w_{Y,Z}$. The slope is obtained from the 3D rotation matrix R, projected to the respective 2D plane, such that $w'_Y = R_{1,0}/R_{0,0}$ and $w'_Z = R_{2,0}/R_{0,0}$. Finally, the compression and torsion of the spring 31 is obtained from the X-component of the translation and the respective rotation angle. Force and translation—respectively moment and torsion—are related by the spring 31 stiffness constant.

6D Force and/or Torque Sensor with Unconstrained Beam/Spring

Figure 4B:
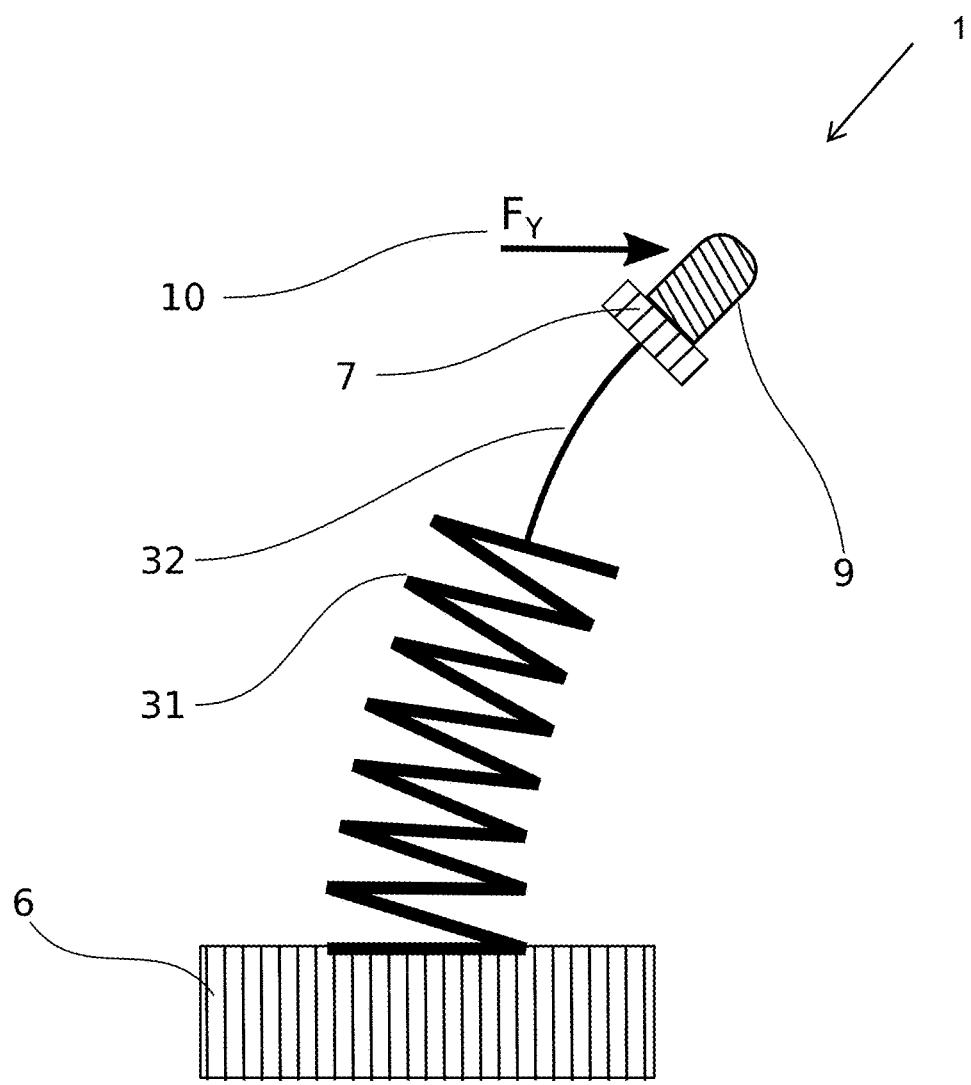
FIG. 4b illustrates the sensor according to FIG. 4a when an external force 10 is applied to the tool 9

Another embodiment of the 6D force and/or torque sensor based on two passive elastic elements 31,32 is built according to FIG. 4a. FIG. 4b shows the structure of FIG. 4a in a deformed state, when a force $F_Y$ 10 is applied. This design is similar to the aforementioned embodiment i.e. FIG. 2a, except for the fact that the spring 31 is not constrained by a linear guiding. The spring 31 deforms in all six dimensions, when a 3D force and/or a 3D torque 10 is applied to the end-point or tool 9. At the same time, the beam 32 also deforms in multiple dimensions. Since the beam 32 is very stiff along axis X, it effectively deforms only in response to forces and/or torques in four dimensions, namely for $F_{Y,Z}$ and $T_{Y,Z}$. The two deformable elements 31,32 are therefore coupled and deform simultaneously for 4 out of 6 force and/or torque dimensions. Compared to aforementioned beam-based embodiment, this embodiment of the present disclosure advantageously allows for more compact sensors with an even simpler mechanical structure. Also, the deformations of the two elements 31,32 are decoupled in the aforementioned beam-based embodiment, which allows for a separate adjustment of the respective stiffness parameters.

As shown in FIG. 4a, a spring 31 is mounted at its base to the base element 6, which is also used as a mount. A flexible beam 32 is mounted to the other end of the spring 31 at point 38. The beam 32 is connected to front element 7. A tool 9 is also mounted to the front element 7. It is possible to build both the spring 31 and the beam 32 from one single wire. The material and geometric parameters of the flexible elements are chosen according to design criteria, such as desired force/torque range applied to 9, maximal acceptable deformation and measurement accuracy.

Templates or any other kind of visual feature that allows for visual 6D pose estimation are placed on planar structures 80,81,82 attached at or near 6, 38 and 7. The 6D poses (position and rotation) of these locations are known from the feature pose and the constant offset between the location and its respective feature. Accurate 6D poses can be obtained, for instance, with a combined tracker/detector, as described above. Placing the features close to the given locations ensures a high pose accuracy. Additional features may be placed anywhere along the flexible elements to improve the accuracy of pose estimation. A camera is placed such that it observes all these features with an image resolution sufficient for the desired force and/or torque resolution. It may be fixed to the base 6, as for camera 42, or fixed to another structure, as for camera 41. In the former case, if the connection between 42 and 6 is known, feature 83 may be omitted. Otherwise, 6 serves as a local reference frame, which the other poses are expressed in.

The deformations of 31 and 32 are determined individually from the pose change between 6 and 38, or 38 and 7, respectively. Applied forces and/or torques 10 in 6D are determined using a deformation model, as outlined above. Compression of the spring 31 along its major axis caused by $F_X$, as well as torsion around this axis caused by $T_X$ may be modeled according to Hooke's law. Deformation caused by $F_{Y,Z}$ and $T_{Y,Z}$ is modeled by the beam theory, applied individually for both elastic elements 31 and 32. In that case, two measurements are available, which improves measurement accuracy or robustness to partial occlusions. Deformation models may also be calibrated/learned using a generic model by applying test forces and/or torques to the sensor.

6D Force and/or Torque Sensor with Unconstrained Spring

Figure 5A:
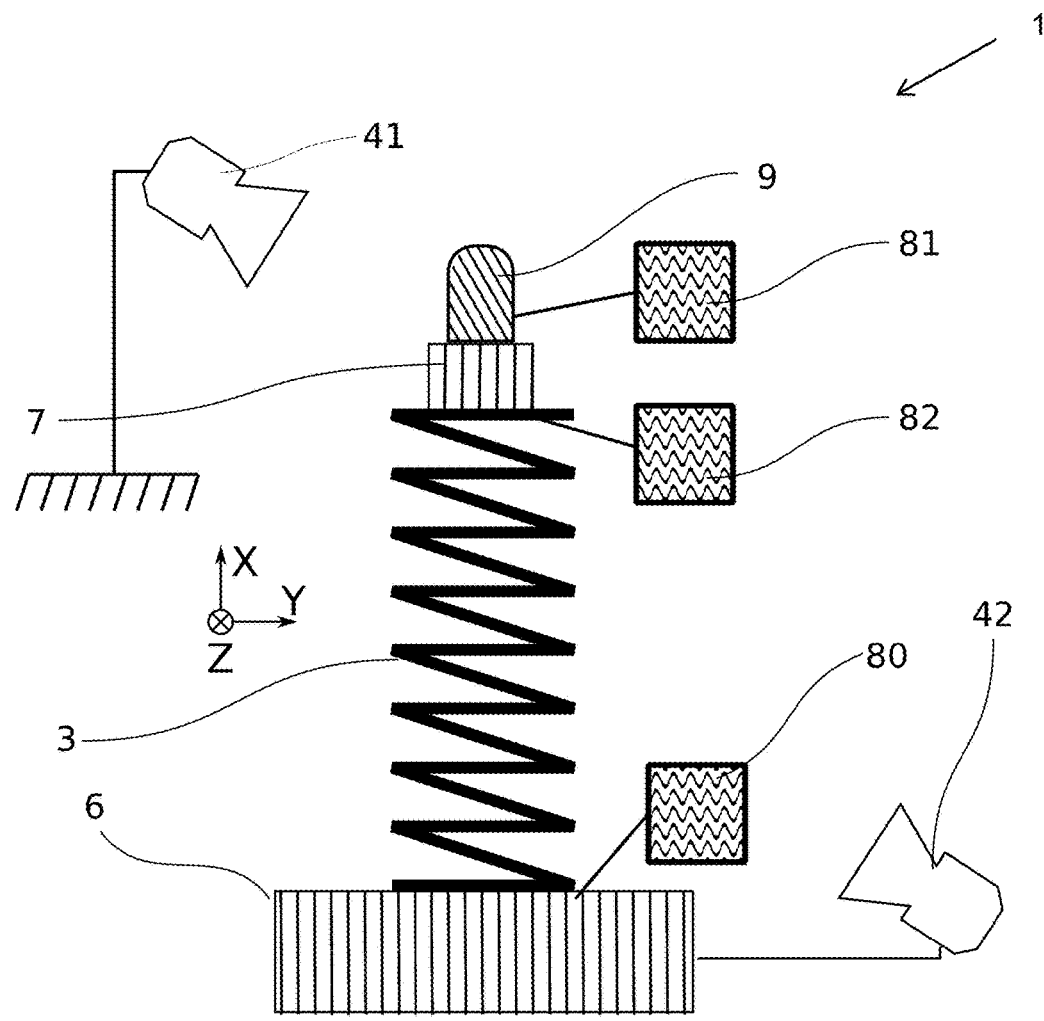
FIG. 5a illustrates a 6D force and/or torque sensor with an unguided spring 3 as the deformable element.
Figure 5B:
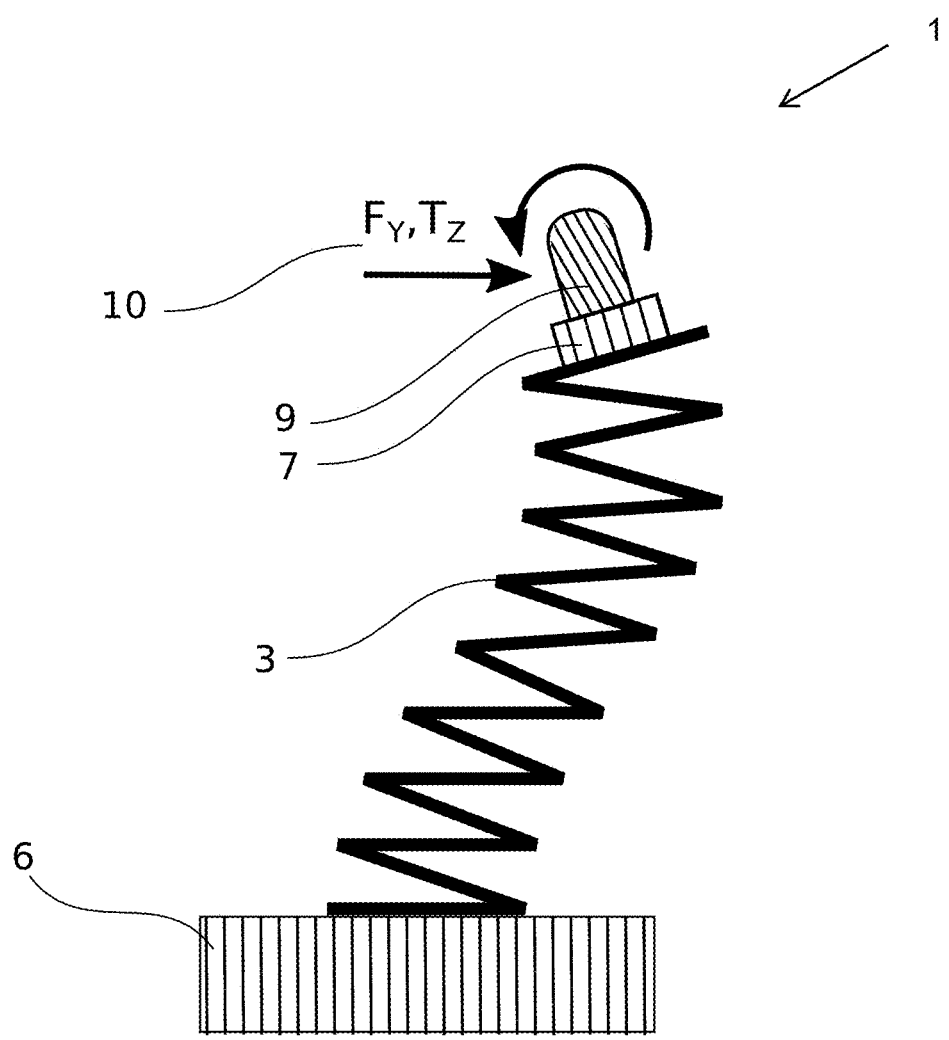
FIG. 5b illustrates the sensor according to FIG. 5a when an external force and torque 10 are applied to the tool 9.

In another embodiment, see FIG. 5a, the flexible structure consists only of a single element, the spring 3. Compared to embodiment illustrated in FIGS. 2a and 4a, the flexible element 32 is missing. The tool 9 is connected to the front element 7 at the end of the spring—either directly, or with a rigid structure. Since the end of the spring deforms in 6D, a 6D force and/or torque 10 applied to 9 is mapped to a 6D deformation of the spring 3, which is expressed by a 6D transformation of 7 with respect to the non-deformed state. The force and/or torque 10 is derived by a deformation model as outlined with respect to FIGS. 4a and 4b, except that there is no second measurement from 32. The structure is depicted in a deformed state in FIG. 5b, when a force $F_Y$ and a torque $T_Z$ are applied simultaneously.

6D Force and/or Torque Sensor Based on Disks Connected by Deformable Elements

Figure 6:
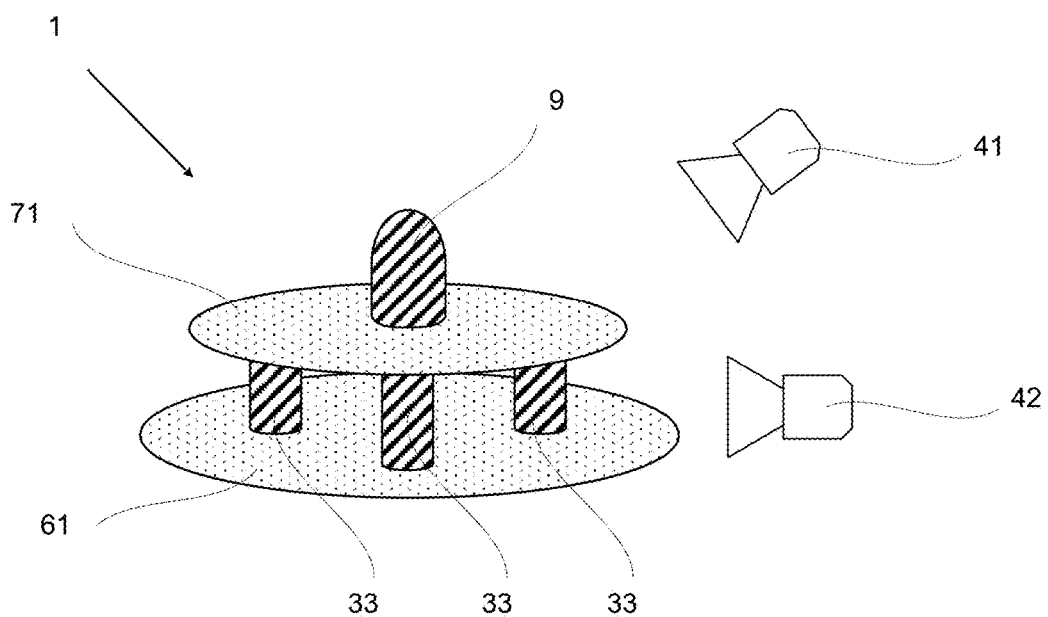
FIG. 6 illustrates a 6D force and/or torque sensor based on two disks that are connected by deformable elements.

FIG. 6 illustrates a 6D force and/or torque sensor based on two disks 61, 71 that are connected by deformable or elastic elements 33. In this implementation, disk 61 serves both as the base element 6 and as the planar structure 80. Disk 71 serves as the front element 7 and the planar structure 81. The two disks are connected via elastic elements 33. Assuming that the sensor is fixed on 61, a 6D force and/or torque 10 applied to disk 71 or to tool 9 attached to 71 is measured by the change of pose of 71 with respect to 61. The external structure resembles that of commercial 6D force and/or torque sensors such as the JR3, and can thus replace corresponding sensors in existing setups of robotic systems. In typical applications, the sensor is mounted to a robotic arm or the end of a kinematic chain at 61. A gripper, manipulator or tool 9 is mounted to the disk 71.

The two disks are made of a rigid material and serve as mounting plates. They can be of arbitrary shapes, whereby planar structures are most feasible. The disks are connected by one or several elastic elements 33, such as springs, rods of rubber or rubber foam. The elements should exhibit an elastic deformation behavior. The dimensions, arrangement and stiffness of these elements are chosen according to the required 6D sensitivity and measurement range of the sensor. There is a direct relationship between pose changes (in 6D) and a 6D force and/or torque 10 applied to 71, which is referred to as deformation model. This model can be obtained analytically, by simulation or by calibration. In the latter case, known force and/or torque values are applied, and the observed deformation is stored.

In case of a single beam-like deformable element, the relationship is expressed as discussed in the above background section describing modeling deformation of beams. The 6D poses of disks 61 and 71 are determined by at least one camera, such as cameras 41,42, based on features, templates or patterns on the disks 61,71. For instance, the pose of an arbitrary texture may be found as described in the above background section describing a combined detector and tracker. An even simpler approach is to find at least four uniquely identifiable features on each disk. If a depth camera is used, the poses can also be derived from the 3D surfaces or structure. A sufficient part of both disk must be observable for pose estimation.

In case of a camera position similar to camera 41, disk 71 could be made smaller, or it could be made partly transparent. In the latter case, parts of disk 61 that are seen through 71 are refracted. Displacements caused by refraction must be compensated. In case of camera arrangement according to camera 42, the inner surfaces of both disks 61,71 can be observed, except for parts that are occluded by the deformable elements 33. The pose of 71 is always expressed in the coordinate frame of 61, which allows both the cameras 41,42 and the entire sensor to move. A reference or zero pose is obtained when no external force 10 is applied to 71 or the tool 9. When an external force or torque 10 is applied, the pose of 71 changes from this reference pose. This change is converted to a force and/or torque based on the above-mentioned deformation model.

In preferred implementations, the sensor is built according to FIG. 2a and FIG. 6.

Experiments with the Beam-Based Sensor
Measurement Precision

The accuracy of the beam-based sensor is analyzed in an experiment with the sensor depicted in FIG. 3. The mechanics of the sensor are build according to FIG. 2a, whereby the spring steel beam 32 between point 39 and 7 exhibits a length of 12 cm and a diameter of 1.5 mm. Its material parameters for Eqn. (2) are E=206 GPa; I=¼$\pi r^4$=2:48·10$^{-13}$ m$^4$. The planar structures 80 with a template of 4×4 cm is attached to the base element 6 as a reference, and two more planar structures 81,82 are attached to the beam 32 at a single point. The frame is fixed at base element 6, and a robot arm pushes against the sensor tip at the front element 7 along $F_Y$. The applied force is increased stepwise from zero to a maximum value, and then again decreased in the same fashion. Force and position are recorded using precise arm sensors as a reference. A webcam with 1600×896 px observes the templates on planar structures 80,81,82 from above (along −Z) and determines 6D force and/or torque 10 values according to Eqn. (3).

Figure 7:
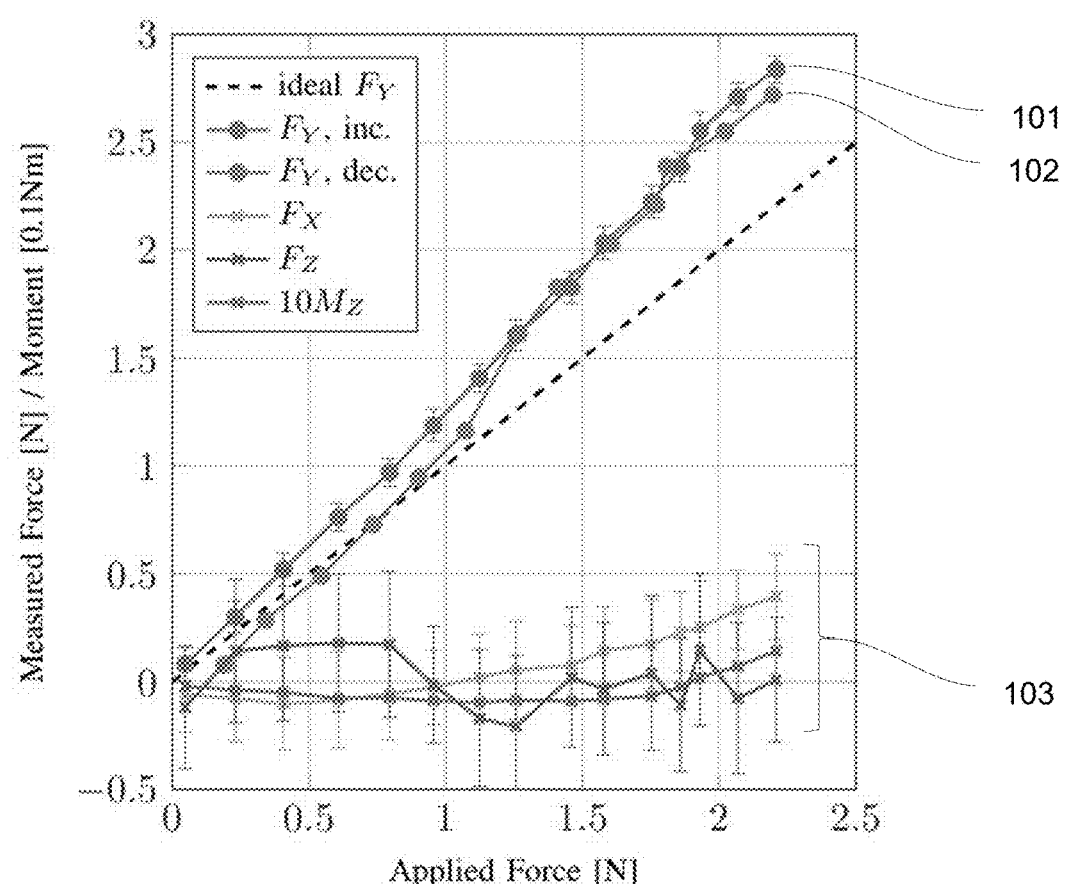
FIG. 7 illustrates the accuracy of the beam-based sensor being tested by applying a force with a Kuka LWR arm along F. Error bars indicate the standard deviation and are scaled by a factor of 2 for $F_Z$ and 5 otherwise.

The obtained results are shown in FIG. 7. Since the force 10 is applied only along $F_Y$, it is expected that all other force and torque components 103 remain zero. Indeed, crosstalk to other components is small. The moment $M_Z$, which is mathematically strongly coupled with $F_Y$, deviates from zero only for large forces. The force $F_X$ exhibits a low level of coupling, since deformations along Y also shorten the beam 32 along the X-direction. This effect is currently not modeled. Also, a small systematic error, i.e. a deviation from the ideal line, is observed. This may be attributed to incorrect material parameters and to the approximations used in beam theory. A compensation of this error is straight-forward using a calibration process. Contrary to foam-based sensors, there is no hysteresis effect when increasing the force, curve 101, or decreasing the force, curve 102. As expected, sensor noise increases with increasing camera distance. However, the noise level is very low, except for the $F_Z$ component. In order to increase accuracy for $F_Z$—which should be done for larger distances—either a depth/stereo camera and tracker could be used, or observations from two cameras at different locations could be combined.

Robotic Manipulation

Figure 8:
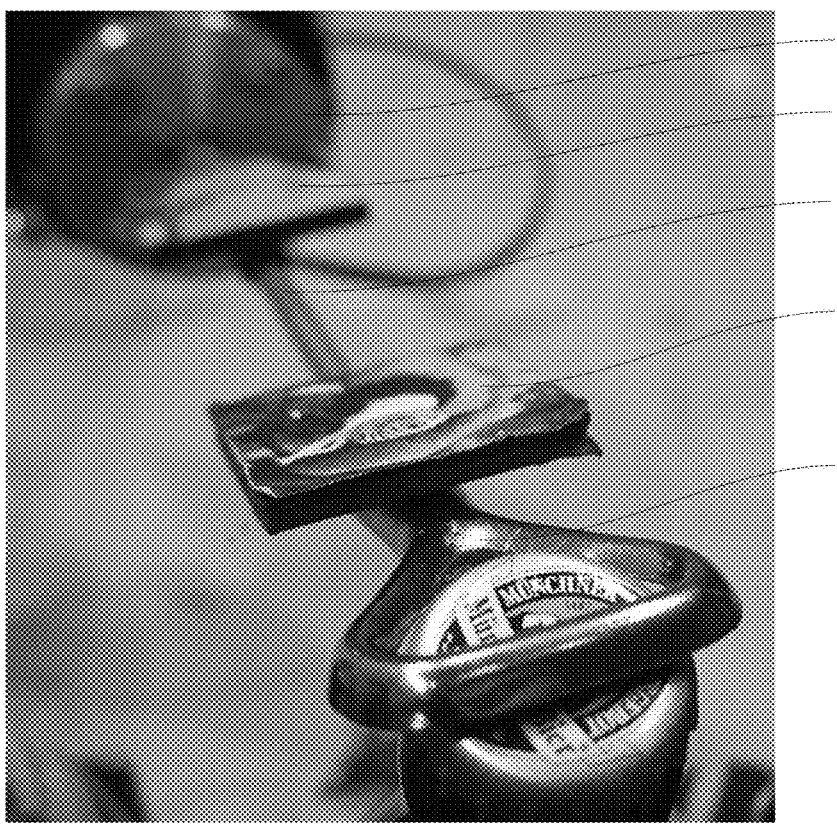
FIG. 8 illustrates the opening of a crown cap with a bottle opener used as tool 9 and mounted on a beam-based visuo-haptic sensor. Planar structures 80, 81 are used to determine the pose change of deformable element 31.
Figure 9:
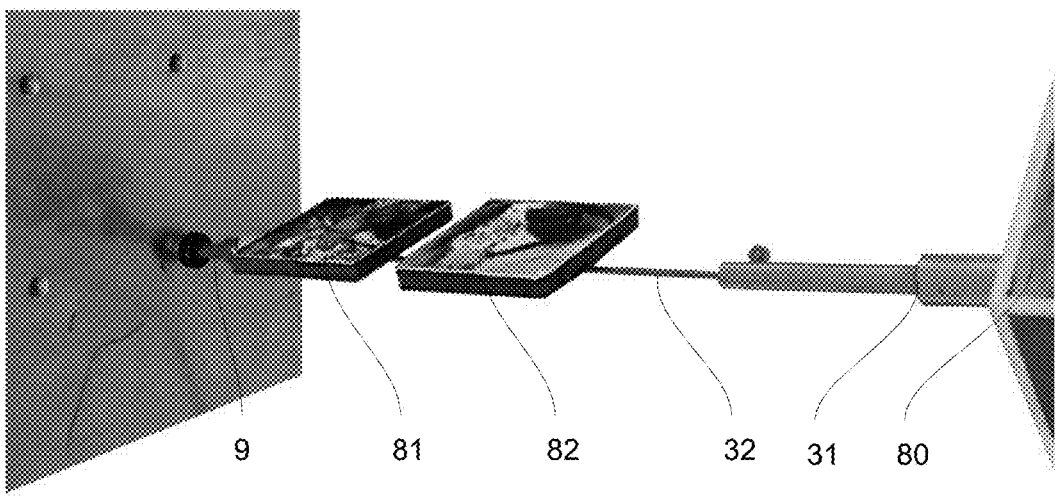
FIG. 9 illustrates a sensor according to FIG. 3 mounted on a robot arm to measure forces and/or torques while mounting a screw.

Opening a crown cap, as used on many beverage bottles, is a good example for a manipulation operation which relies on joint visuo-haptic perception. For this experiment, a standard bottle opener is mounted onto a beam-based sensor according to FIG. 2a, see FIG. 8. The sensor is mounted on the end-effector of a Kuka LWR arm, together with a webcam, camera 4. Beam deformations caused by forces or torques 10 applied to the crown cap are observed using the template pictures on planar structures 80,81. Furthermore, the webcam observes the scene near the tool 9 in order to search for the bottle. The visuo-haptic sensor is the only sensor used in this system—the dedicated force and/or torque sensors of the robot arm are not used.

Bottles are recognized and tracked using the texture on their crown caps with a template-based detector/tracker. As soon as the user selects the desired bottle, the robot scans for it within its working space. Once the object has been detected and localized, the arm moves the tool 9 above the object and rotates it as required for the uncapping operation. The accuracy of this rotation movement is limited by two factors: Since the wrist joint of the arm is relatively far from the tool 9, a large motion is required in the joint space. This goes along with a larger positioning error (which could, however, be compensated by visual servoing). Yet, the used 2D tracker has only a limited depth accuracy—the height of the crown cap cannot be determined exactly. The alignment of the tool 9 on the crown cap must be very accurate in all dimensions in order to perform the uncapping successfully.

This level of precision is impossible using pure vision, especially for the depth direction. The exact position of the opener is determined haptically, by measuring the forces or moments with the visuo-haptic sensor. Refinement is first performed along the z-axis (height), the x-axis and finally they-axis. Once the tool 9 is aligned, the arm rotates the tool 9 around its center point. If the crown cap has been removed successfully, the tracker/detector will no longer detect its texture on top of the bottle.

What is claimed is:
1. An apparatus, comprising:
a haptic element comprising at least one optically opaque passive elastically deformable element deformable in multiple dimensions, the haptic element having a first end firmly attached to a movable robot arm and an opposite second end firmly attached to a robot tool;
at least one camera external to the haptic element and operable to capture images of an outside of the elastically deformable element; and
a processor operable to
determine a change of pose of the elastically deformable element by visual tracking and determine a measurement of force and torque applied to the elastically deformable element based on the captured images and the determined change of pose, wherein the measurement includes at least three components comprising forces and/or torques, wherein the measurement comprises a 6-axis force and torque vector comprising forces along all three spatial dimensions and torques along all three spatial dimensions.

2. The apparatus of claim 1, wherein the haptic element further comprises a rigid base element and a rigid front element coupled via the elastically deformable element; and wherein the processor is further operable to determine the change of pose of the rigid front element with respect to the base element.

3. The apparatus of claim 2, wherein the deformable element comprises a beam and/or a tool which is mounted to the front element.

4. The apparatus of claim 2, wherein the rigid base element and rigid front element comprise planar structures.

5. The apparatus of claim 1, wherein the change of pose is determined by observing at least two points on the haptic element.

6. The apparatus of claim 1, wherein the change of pose is determined by observing three or more points on the haptic element.

7. The apparatus of claim 1, further comprising a visual tracker to determine the change of pose.

8. The apparatus of claim 1, wherein the haptic element is mechanically attached to a movable robotic element and the movable robotic element is arranged in a field of view of the camera.

9. A method, comprising:

providing a haptic element comprising at least one optically opaque passive elastically deformable element deformable in multiple dimensions, firmly attaching a first end of the haptic element to a movable robot arm and firmly attaching an opposite second end of the haptic element to a robot tool;

capturing images of an outside of the elastically deformable element with at least one camera;

determining a change of pose of the elastically deformable element by visual tracking; and determining a measurement of force applied to the elastically deformable element based on the captured images and the determined change of pose, wherein the measurement of force includes at least three dimensions including both force and torque components, wherein the measurement comprises a 6-axis force and/or torque vector comprising forces along all three spatial dimensions and torques along all three spatial dimensions.

10. The method of claim 9, wherein the step of determining the change of pose comprises observing at least two points on the haptic element.

11. The method of claim 9, wherein the step of determining the change of pose comprises observing three or more points on the haptic element.

* * * * *